United States Patent
Song

(10) Patent No.: US 12,160,708 B2
(45) Date of Patent: Dec. 3, 2024

(54) HEARING DEVICE, AND METHOD FOR ADJUSTING HEARING DEVICE

(71) Applicant: Olive Union, Inc., Seoul (KR)

(72) Inventor: Myung Geun Song, Seoul (KR)

(73) Assignee: Olive Union, Inc., Seoul (KR)

( * ) Notice: Subject to any disclaimer, the term of this patent is extended or adjusted under 35 U.S.C. 154(b) by 195 days.

(21) Appl. No.: 17/793,370

(22) PCT Filed: Jan. 17, 2020

(86) PCT No.: PCT/JP2020/001523
§ 371 (c)(1),
(2) Date: Jul. 15, 2022

(87) PCT Pub. No.: WO2021/144964
PCT Pub. Date: Jul. 22, 2021

(65) Prior Publication Data
US 2023/0056862 A1    Feb. 23, 2023

(51) Int. Cl.
*H04R 25/00* (2006.01)
*G06F 3/01* (2006.01)
*G06F 3/16* (2006.01)

(52) U.S. Cl.
CPC .......... *H04R 25/505* (2013.01); *G06F 3/017* (2013.01); *G06F 3/165* (2013.01); *H04R 25/554* (2013.01); *H04R 25/558* (2013.01); *H04R 25/75* (2013.01); *H04R 2225/41* (2013.01); *H04R 2225/55* (2013.01); *H04R 2225/61* (2013.01); *H04R 2460/07* (2013.01)

(58) Field of Classification Search
CPC ............ H04R 2225/41; H04R 2225/55; H04R 2225/61; H04R 2460/07; H04R 25/505; H04R 25/554; H04R 25/558; H04R 25/75; H04R 1/1041; H04R 1/1083; H04R 2225/43; H04R 25/50; H04R 25/507; G06F 3/165
USPC .......................................................... 38/315
See application file for complete search history.

(56) References Cited

U.S. PATENT DOCUMENTS

| | | |
|---|---|---|
| 7,925,029 B2 | 4/2011 | Hollemans |
| 9,549,269 B2 | 1/2017 | Notzel |
| 2018/0122025 A1 | 5/2018 | Boesen |

FOREIGN PATENT DOCUMENTS

| | | | | |
|---|---|---|---|---|
| EP | 2925020 A1 * | 9/2015 | ............. | H04R 25/50 |
| JP | 2006-524003 A | 10/2006 | | |

(Continued)

OTHER PUBLICATIONS

International Search Report in International Patent Application No. PCT/JP2020/001523, mailed Mar. 10, 2020 (4 pages w/English translation).

*Primary Examiner* — Phylesha Dabney
(74) *Attorney, Agent, or Firm* — NIXON PEABODY LLP

(57) ABSTRACT

A hearing device directly or indirectly connected to a server through a network, the hearing device being provided with: an input unit that acquires sound data from the outside; a communication unit that transmits the sound data to the server, and receives a parameter set generated on the basis of the analysis result obtained by analyzing the sound data in the server; a storage unit that stores the parameter set; and an adjustment unit that, on the basis of the parameter set, adjusts gains of a plurality of prescribed frequencies.

12 Claims, 9 Drawing Sheets

(56) References Cited

FOREIGN PATENT DOCUMENTS

| | | |
|---|---|---|
| JP | 2015-130659 A | 7/2015 |
| JP | 2016-504811 A | 2/2016 |

* cited by examiner

[FIG 1]
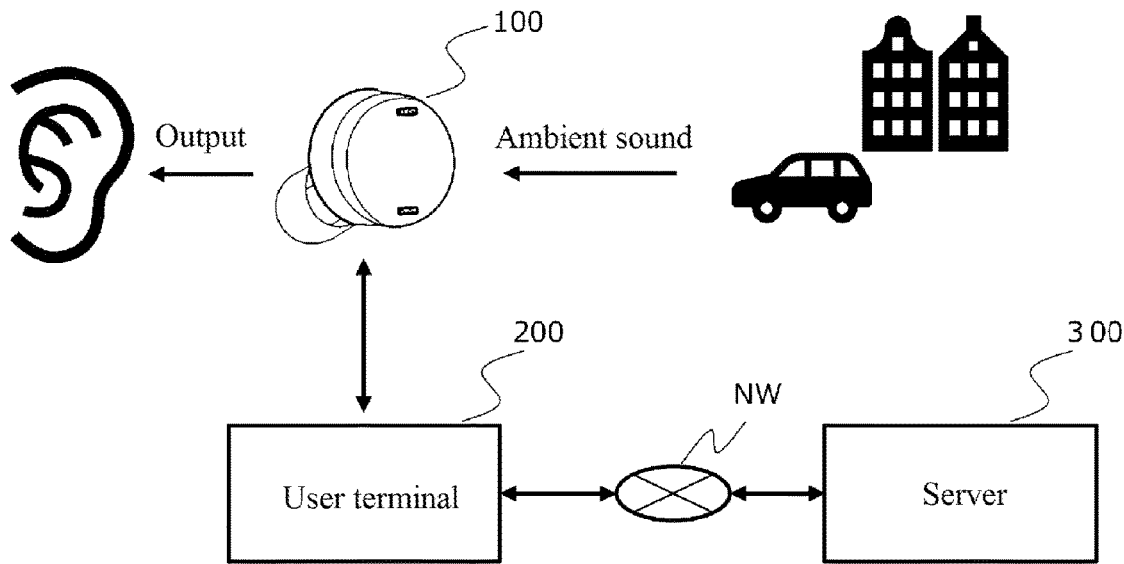
[FIG 2]
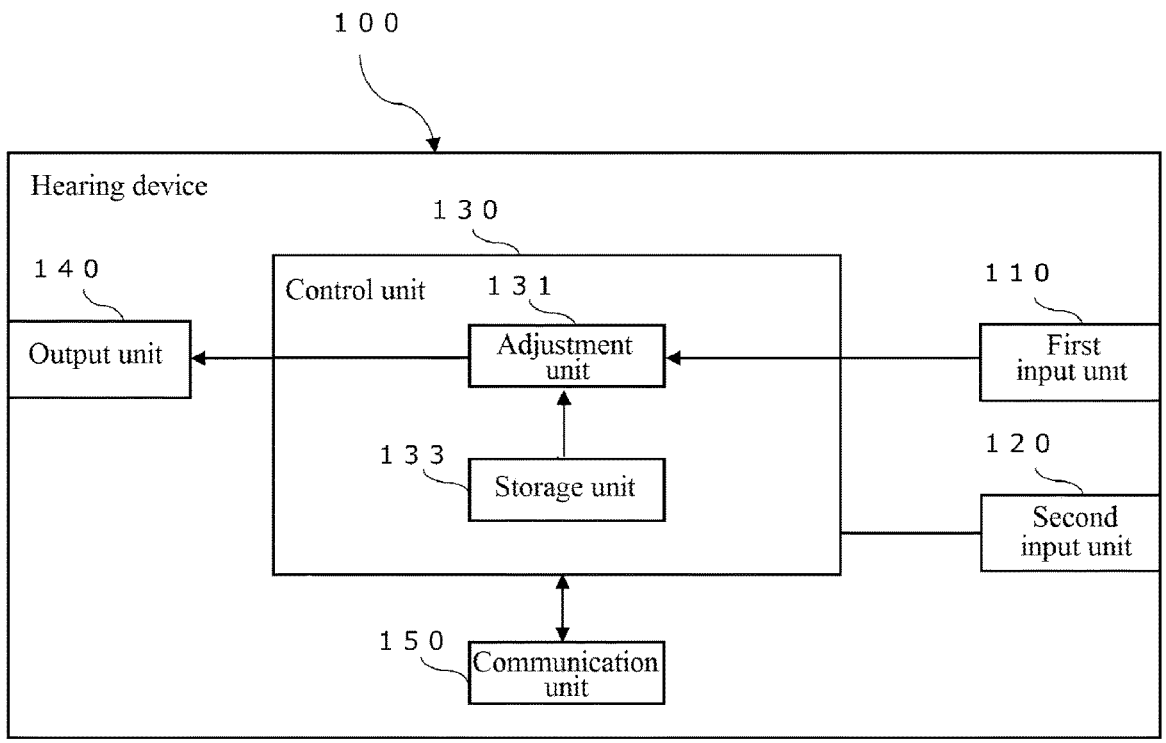

[FIG 3]
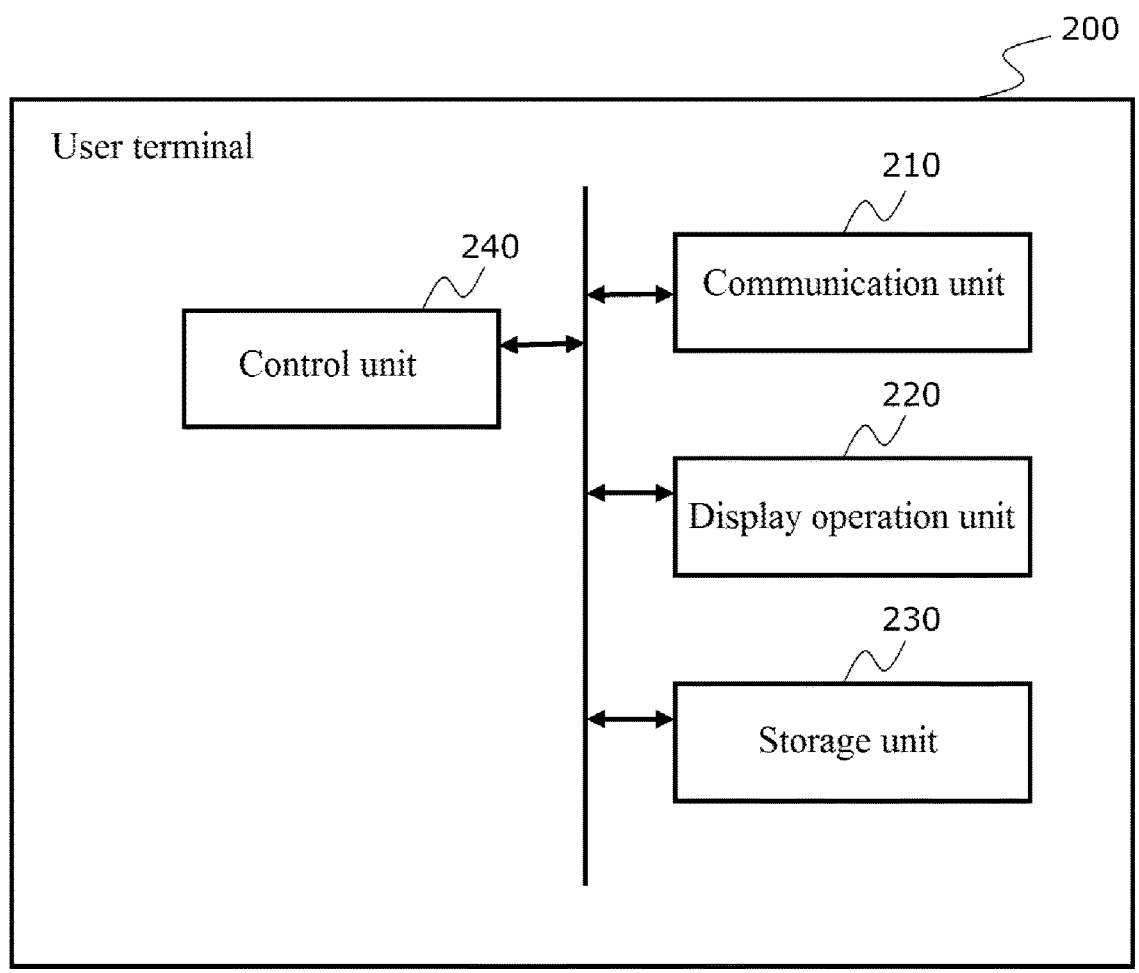

[FIG 4]
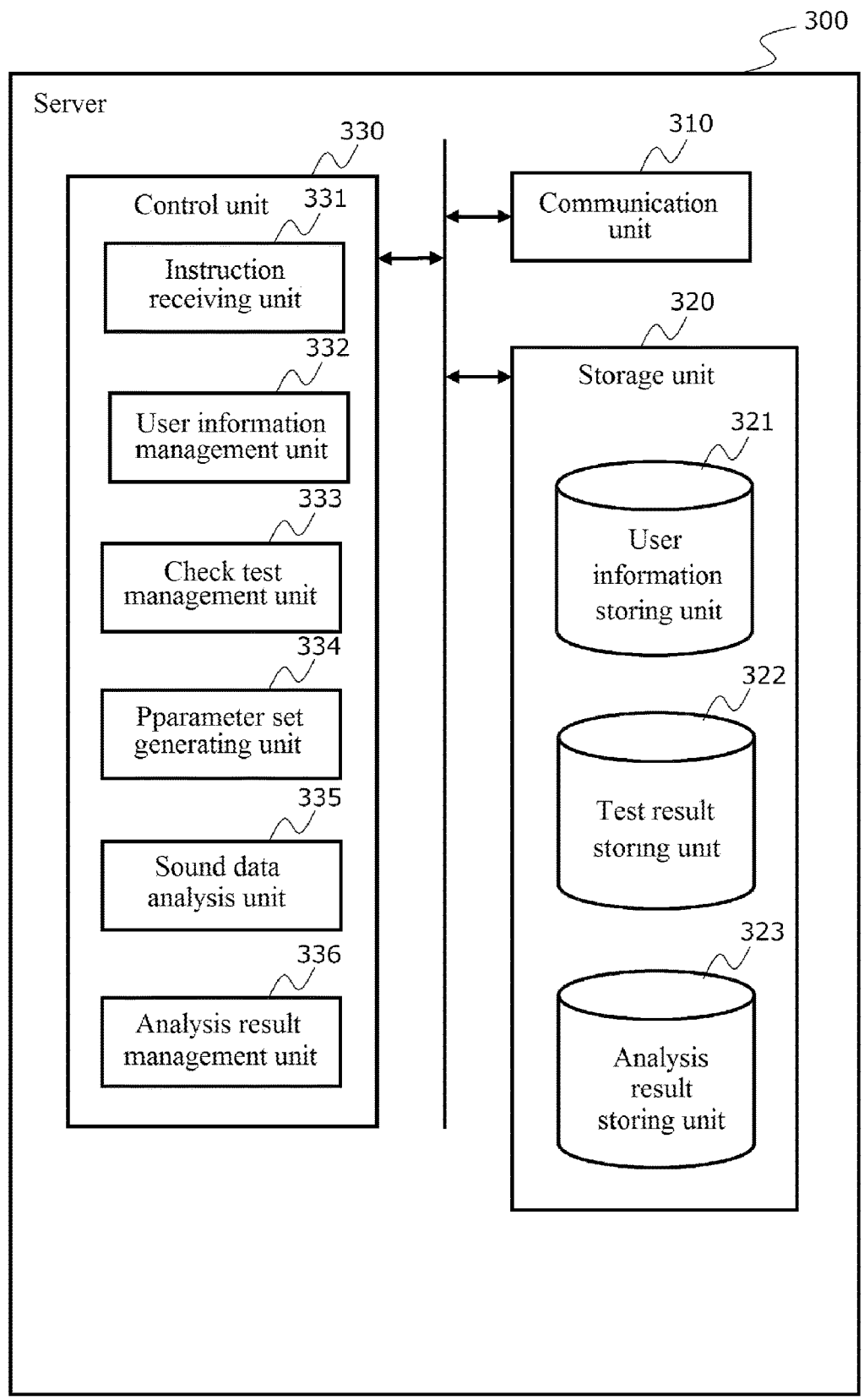

[FIG 5]
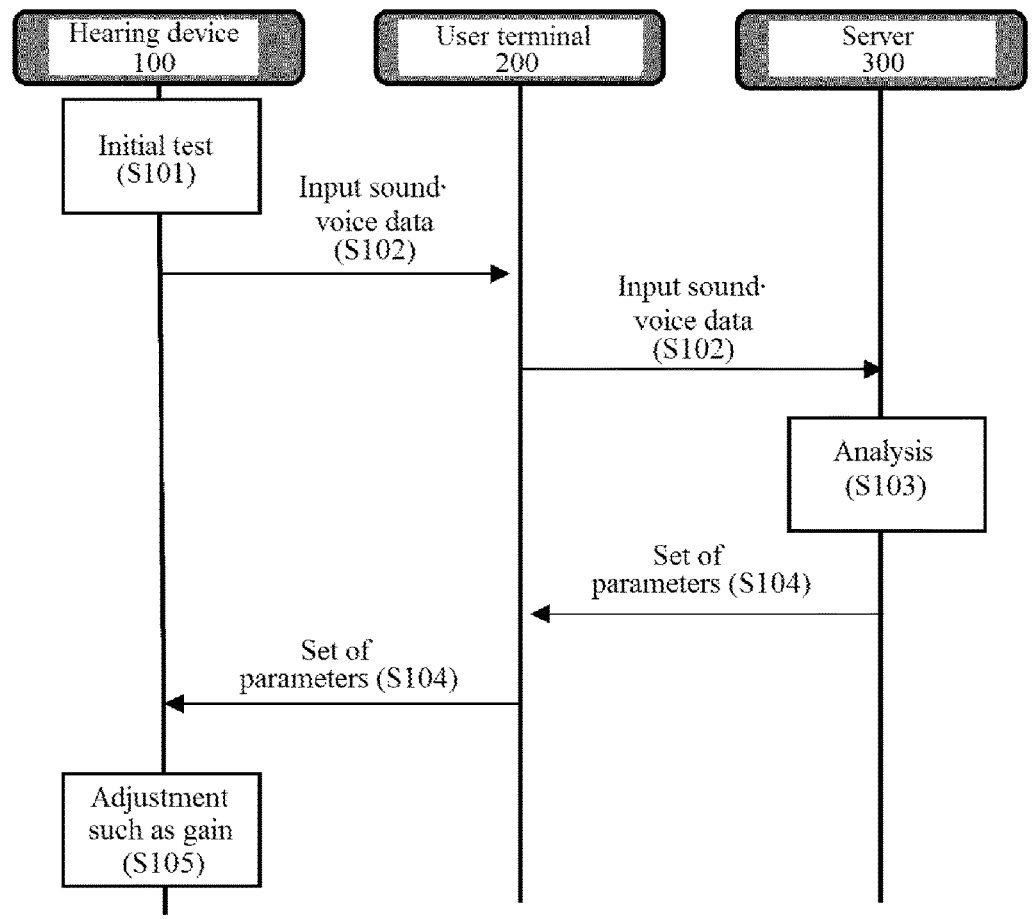
[FIG 6]
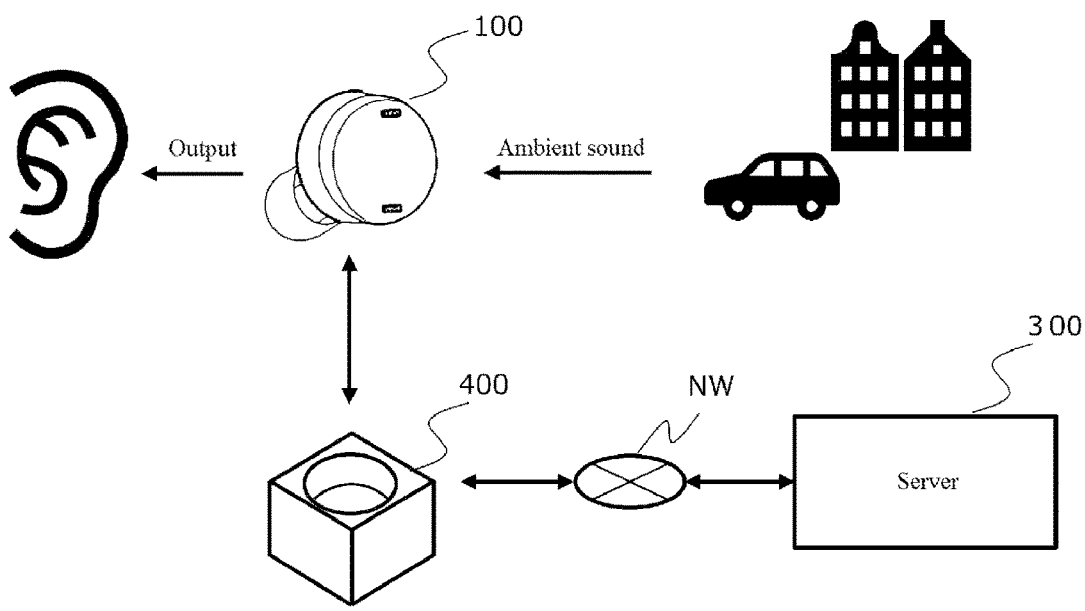

【FIG 7】
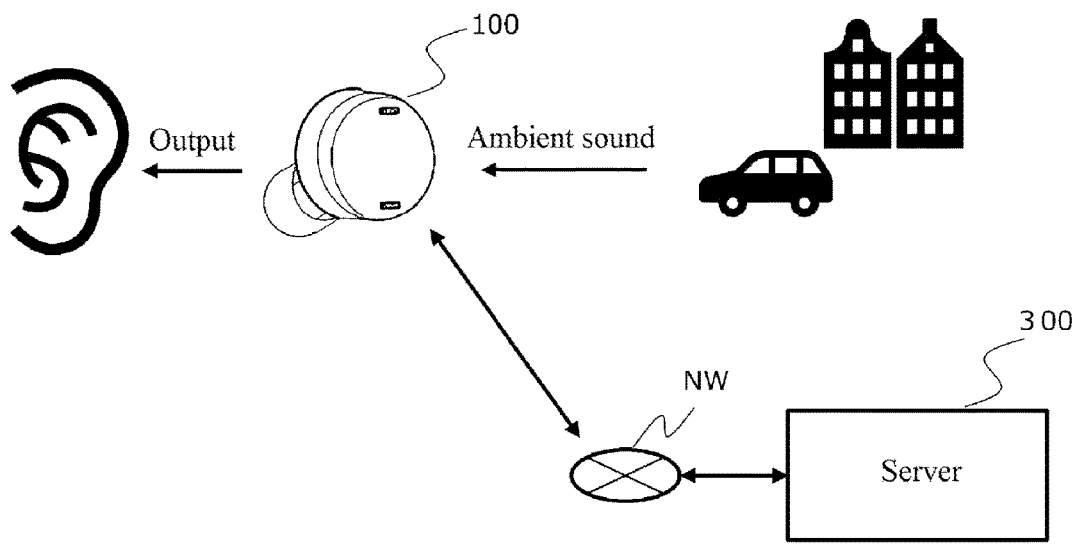
【FIG 8】
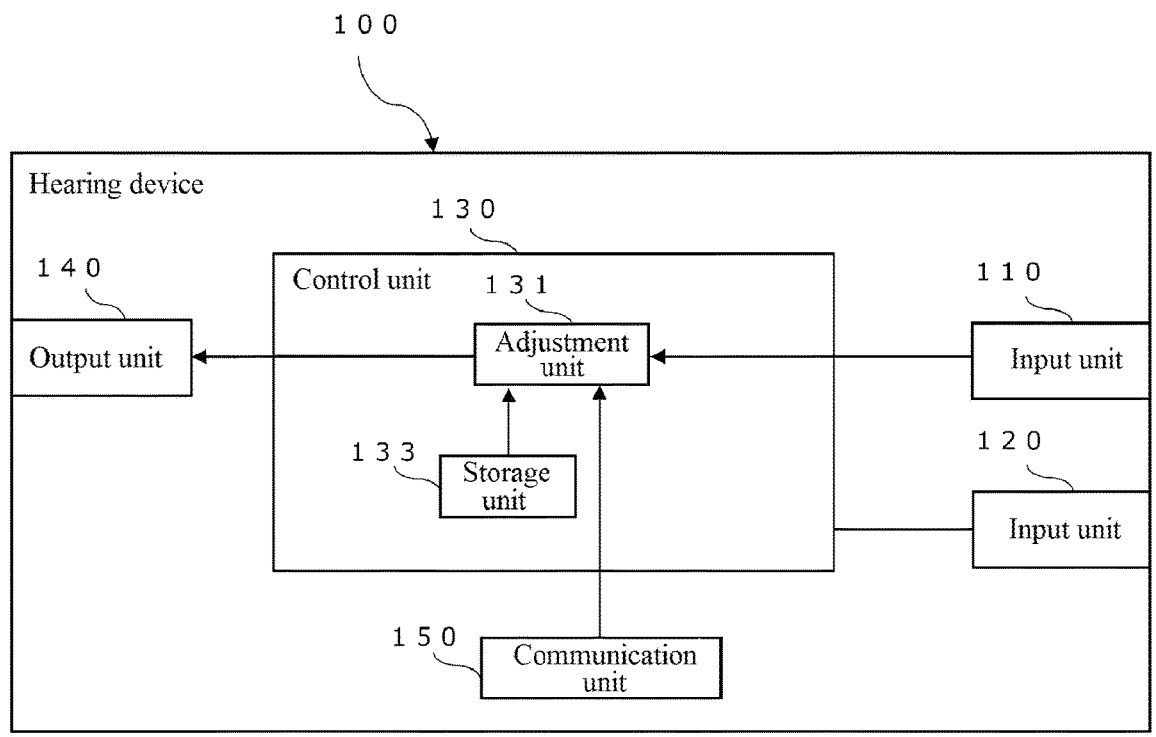

[FIG 9]
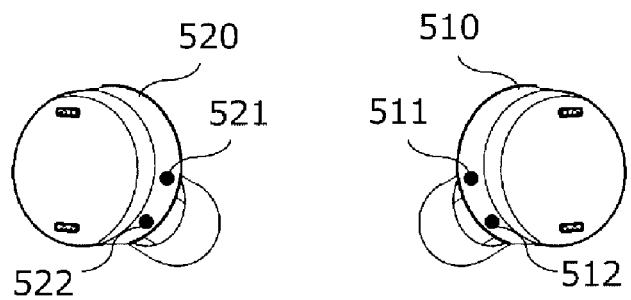
[FIG 10]
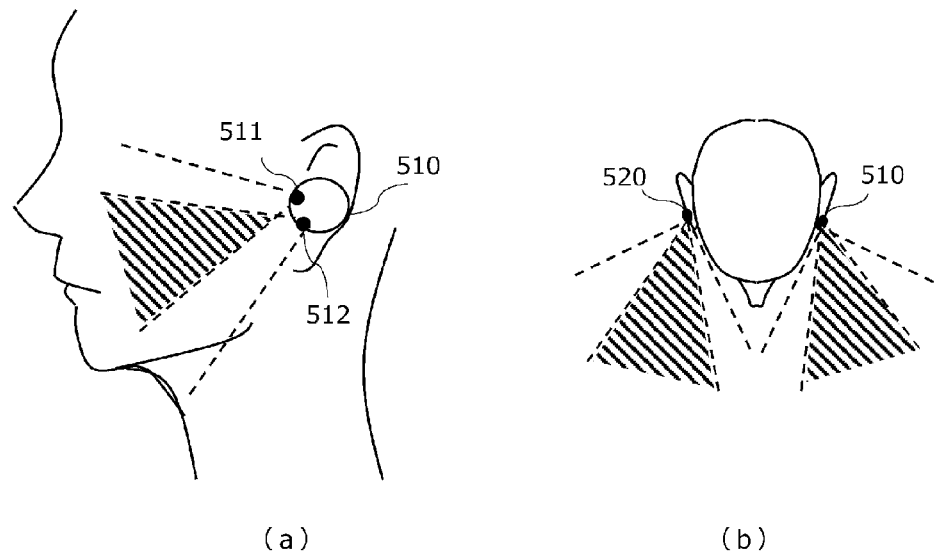
(a)  (b)
[FIG 11]
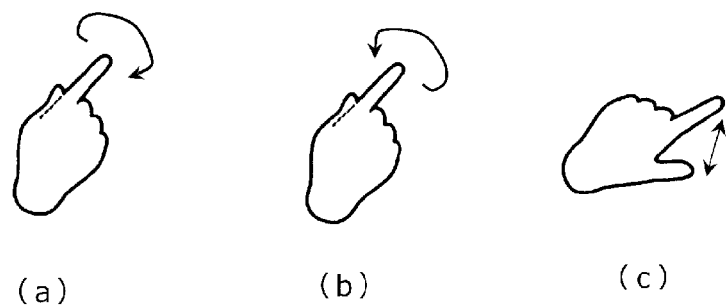
(a)  (b)  (c)

[FIG 12]
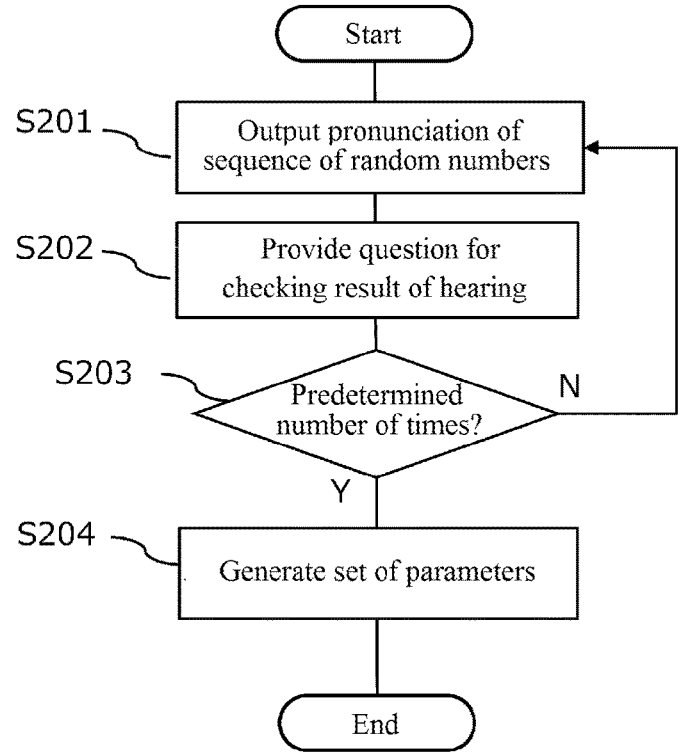
[FIG 13]
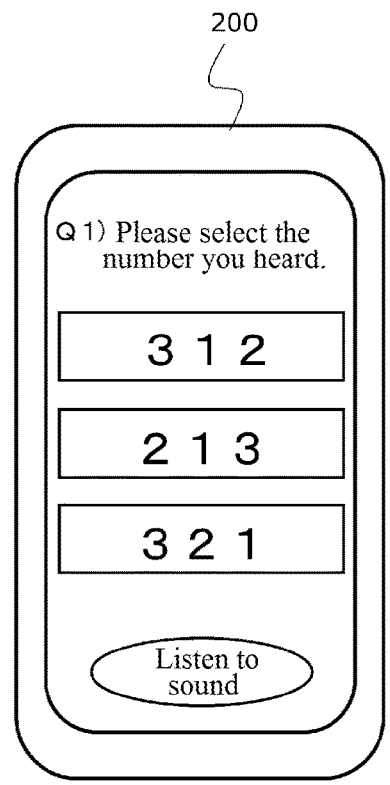

[FIG 14]
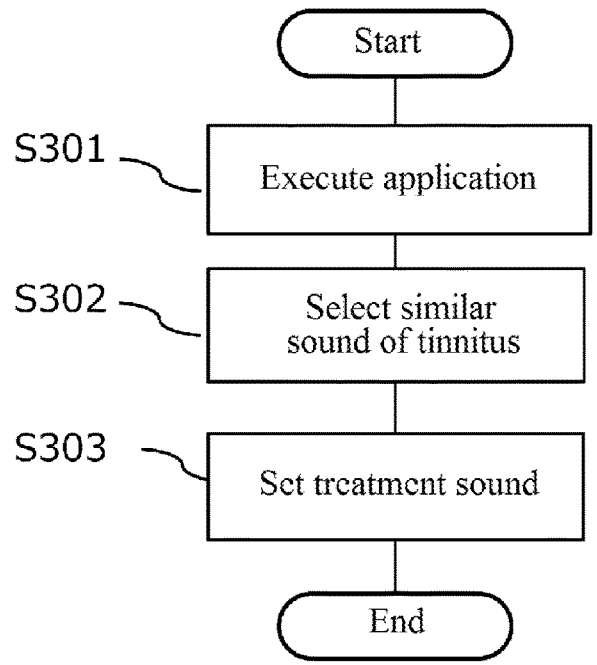
[FIG 15]
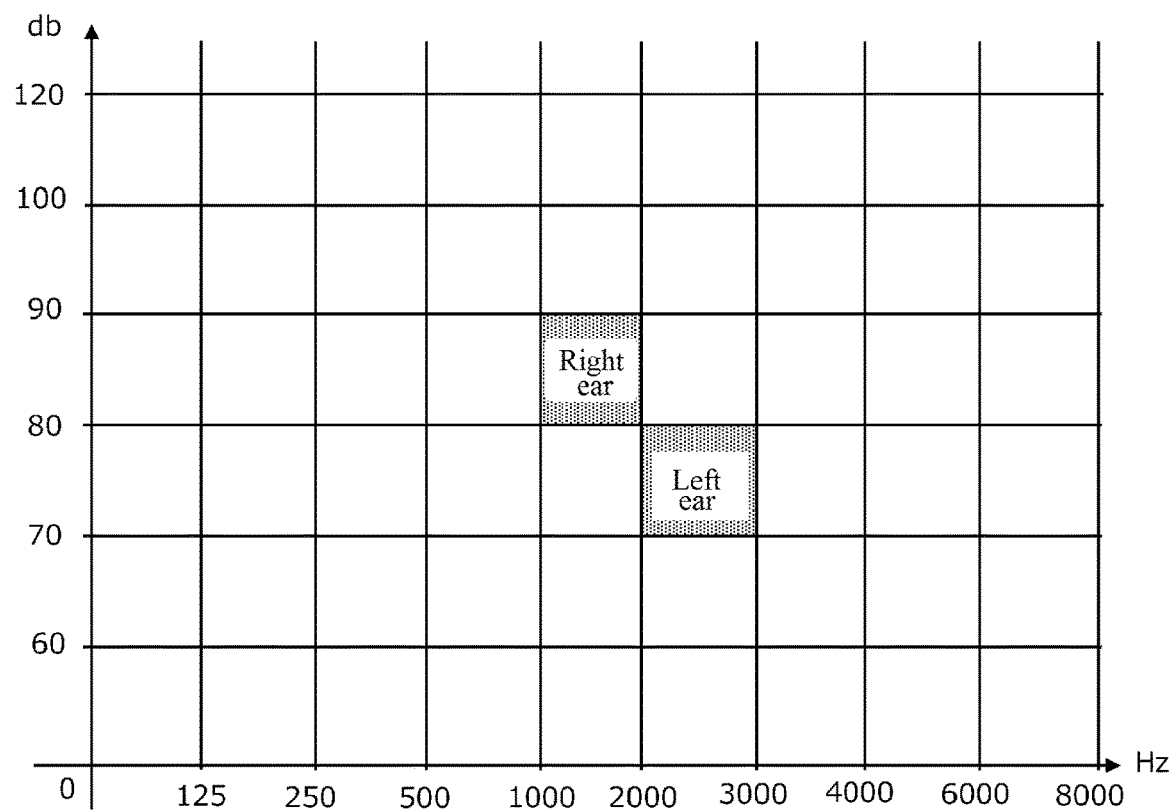

[FIG 16]
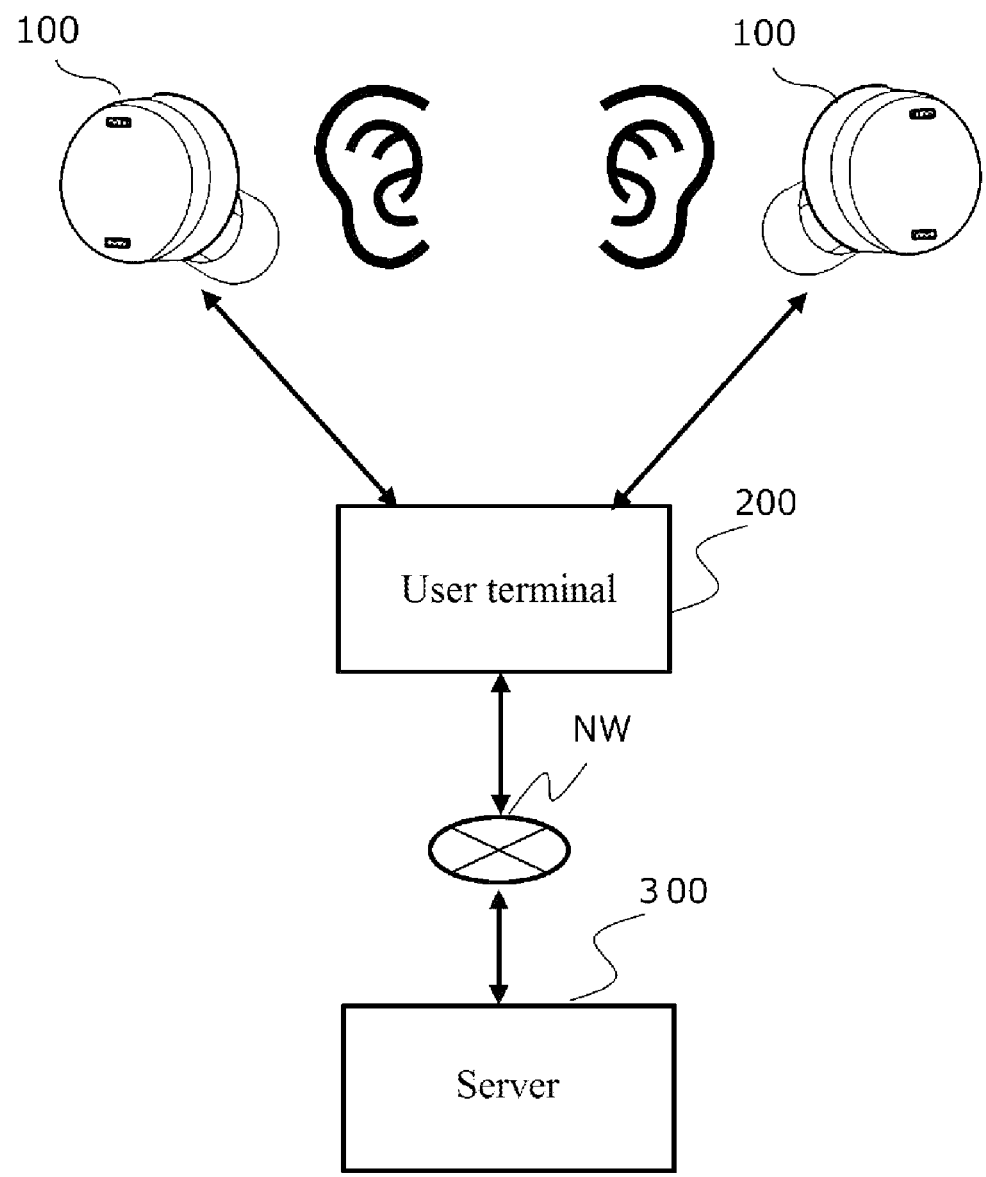

HEARING DEVICE, AND METHOD FOR ADJUSTING HEARING DEVICE

CROSS REFERENCE TO RELATED APPLICATIONS

This application is a U.S. National Stage Application of International Patent Application No. PCT/JP2020/001523 entitled HEARING DEVICE, AND METHOD FOR ADJUSTING HEARING DEVICE, filed on Jan. 17, 2020, which is hereby incorporated by reference herein in its entirety.

TECHNICAL FIELD

The present invention relates to a hearing device and a method for adjusting a hearing device.

BACKGROUND ART

Conventionally, there are hearing devices such as hearing aids and sound collectors. A user with congenital or acquired hearing loss compensates for poor hearing by amplifying an input sound using a hearing device.

For example, Patent Document 1 discloses a hearing aid that adjusts the amplification amount of an input sound according to a user's motion.

PRIOR ART LITERATURE

Patent Literature

Patent Document 1: International Patent Publication No. 2014/010165

DETAILED DESCRIPTION OF THE INVENTION

Technical Problem

However, the hearing aid disclosed in Patent Document 1 merely discloses a mode change according to a user motion (e.g., walking, sleeping, eating, etc.), and does not take into account the environment (for example, environments with large amounts of sound or noise, such as living rooms or train platforms, or environments with low ambient sound or noise, such as study rooms or libraries).

In addition, a mode according to the user's motion is changed by pressing a button, for example. The mode change method is not a problem in the case of mode change according to a user motion that does not change frequently (e.g., walking, sleeping, eating, etc.), but the mode change method is not an appropriate mode change method when a more detailed mode change is required in a situation with many changes such as the above-mentioned environments.

Furthermore, there is a need to provide a hearing device having new functions useful to various users and a new business model using a hearing device.

Accordingly, the present invention provides a hearing device and a method for adjusting the hearing device, which make it possible to finely adjust an input sound and output the sound to a user by performing adjustment in real time according to the sound input to the hearing device (particularly, ambient environmental sound), thereby providing the hearing device with useful new functions to users and providing a new business model using the hearing device.

Technical Solution

According to an aspect of the present invention, a hearing device directly or indirectly connected to a server through a network, the hearing device includes an input unit that acquires sound data from the outside, a communication unit that transmits the sound data to the server and receives a set of parameters generated based on an analysis result obtained by analyzing the sound data in the server; a storage unit that stores the set of parameters; and an adjustment unit that adjusts gains of a plurality of predetermined frequencies based on the set of parameters.

Advantageous Effects of the Invention

According to the present invention, it is possible to finely adjust and output input sound to the user by performing adjustment in real time according to a sound (especially the ambient environment sound) input to the hearing device, thus enabling the user to be in a state capable of hearing easily. Furthermore, it is possible to provide a hearing device having new functions useful to various users and a new business model using the hearing device.

DESCRIPTION OF THE DRAWINGS

FIG. 1 is a block diagram showing a first embodiment of the present invention.

FIG. 2 is a functional block diagram showing the hearing device 100 of FIG. 1.

FIG. 3 is a functional block diagram showing the user terminal 200 of FIG. 1.

FIG. 4 is a functional block diagram showing the server 300 of FIG. 1.

FIG. 5 is an example of a flowchart of an adjustment method related with the first embodiment of the present invention.

FIG. 6 is a block diagram showing a first modification of the first embodiment of the present invention.

FIG. 7 is a block diagram showing a second modification of the first embodiment of the present invention.

FIG. 8 is a functional block diagram showing a hearing device 100 according to a second embodiment of the present invention.

FIG. 9 is a functional block diagram showing a hearing device 100 according to a third embodiment of the present invention.

FIG. 10 is a diagram showing a detection range of a sensor of the hearing device 100 related with the third embodiment of the present invention.

FIG. 11 is a diagram showing an operation of the hearing device 100 through a gesture according to a third embodiment of the present invention.

FIG. 12 is a flowchart showing a new check test method according to a fourth embodiment of the present invention.

FIG. 13 shows an example of a user terminal screen according to a fourth embodiment of the present invention.

FIG. 14 is a flowchart showing a method for reducing tinnitus according to a fifth embodiment of the present invention.

FIG. 15 shows an example of a user terminal screen according to the fifth embodiment of the present invention.

FIG. 16 is a diagram showing an output of the hearing device 100 according to the fifth embodiment of the present invention.

BEST MODE

Hereinafter, embodiments of the present invention will be described with reference to the drawings. In addition, the embodiment does not limit the invention as set forth in the appended claims and all of the components shown in embodiment are not limited to the essential components of the present invention. In addition, in the accompanying drawings, the same or similar reference numerals and names are assigned to the same or similar elements, and overlapping descriptions regarding the same or similar elements in the description of each embodiment may be omitted. Moreover, features shown in each embodiment are applicable to other embodiments as long as they do not contradict each other.

First Embodiment

FIG. 1 is a block diagram showing a first embodiment of the present invention. The first embodiment may include, for example, a hearing device 100 used by a user, a user terminal 200 owned by the user, and a server 300 to which the user terminal 200 is connected via a network NW. The network NW may include the Internet, an intranet, a wireless local area network (LAN), a wide area network (WAN), or the like.

The hearing device 100 may perform, for example, increase/decrease in volume, noise cancellation, adjustment of gain (amplification amount), etc. on an input sound, or execute various functions provided thereon. In addition, the hearing device 100 may provide, to the user terminal 200, acquisition information such as data regarding an input sound (particularly, ambient environmental sound).

The user terminal 200 is a terminal owned by the user, and is, for example, an information processing device such as a personal computer or a tablet terminal, but may be constituted by a smart phone, a mobile phone, a PDA, or the like.

The server 300 is a device that transmits and receives information to and from the user terminal 200 through the network NW and calculates and processes, for example, received information, and may be implemented with a general-purpose computer such as a workstation or a personal computer or, alternatively, may be logically realized by cloud computing. In the present embodiment, one server is exemplified for convenience of description, but the present embodiment is not limited thereto, and a plurality of servers may be used.

FIG. 2 is a functional block diagram showing the hearing device 100 of FIG. 1. The hearing device 100 includes a first input unit 110, a second input unit 120, a control unit 130, an output unit 140, and a communication unit 150. The control unit 130 includes an adjustment unit 131 and a storage unit 132. In addition, although not shown in drawings, various sensors, such as a touch sensor, may be provided in the hearing device 100 to enable a user to operate the hearing device 100 by directly tapping the hearing device 100, or the like.

The first input unit 110 and the second input unit 120 are, for example, a microphone and an ND converter (not shown). The first input unit 110 is disposed near the user's mouth, for example, to acquire a voice including, in particular, the user's voice and convert the voice into a digital signal, and the second input unit 120 is disposed far from the user's mouth to acquire the ambient sound including, in particular, the ambient environmental sound and convert the ambient sound into a digital signal. Although the first embodiment includes two input units, the first embodiment is not limited thereto, and may include, for example, one input unit or three or more input units.

The control unit 130 may control the overall operation of the hearing device 100, and may be configured with, for example, a Central Processing Unit (CPU) or the like. The adjustment unit 131 may be, for example, a DSP (Digital Sound Processor). For example, the DSP is controlled by a set of parameters stored in the storage unit 132 to make the voice received from the first input unit more audible, and more specifically, a gain (amplification amount) is adjusted for each of a plurality of predetermined frequencies (e.g., 8 channels or 16 channels). In addition, the storage unit 132 may store a set of parameters set by a test such as initial settings, or may store a set of parameters based on an analysis result to be described later. These sets of parameters may be individually used for adjustment by the adjustment unit 131 or may be used in combination.

The output unit 140 is, for example, a speaker and a Digital-Analog (D/A) converter (not shown), and may output, for example, voice acquired from the first input unit 110 to the user's ear.

The communication unit 150 may transmit, for example, ambient sound data acquired from the second input unit 120 and/or voice data acquired from the first input unit 110 to the user terminal 200, or receive a set of parameters based on a result obtained by analyzing the ambient sound data and/or voice data (hereinafter, collectively referred to as "sound data"), from the user terminal 200 and transmit the set of parameters to the storage unit 132. The communication unit 150 may be a short-range communication interface such as Bluetooth (registered trademark) and BLE (Bluetooth Low Energy), but is not limited thereto.

FIG. 3 is a functional block diagram showing the user terminal 200 of FIG. 1. The user terminal 200 may include a communication unit 210, a display operation unit 220, a storage unit 230, and a control unit 240.

The communication unit 210 may be a communication interface for communicating with the server 300 through a network NW, and communication is performed according to, for example, communication rules such as TCP/IP. In addition, when using the hearing device 100, it is preferable that the user terminal 200 is in a state capable of communicating with the server 300 at least normally to operate the hearing device 100 in real time.

The display operation unit 220 is a user interface used to allow a user to input an instruction and display text, images, or the like according to input information from the control unit 240, and may be constituted by a touch panel or the like when the user terminal 200 is configured with a tablet terminal or a smartphone. The display operation unit 220 is activated by a control program stored in the storage unit 230 and executed by the user terminal 200 which is a computer (electronic computer).

The storage unit 230 may store programs, input information, and the like for executing various control processes or each function of the control unit 240 and is composed of RAM, ROM, and the like. In addition, the storage unit 230 may temporarily store contents of communication with the server 300.

The control unit 240 may control the overall operation of the user terminal 200 by executing a program stored in the storage unit 230, and may include CPU, GPU, or the like.

FIG. 4 is a functional block diagram of the server 300 of FIG. 1. The server 300 may include a communication unit 310, a storage unit 320, and a control unit 330.

The communication unit 310 is a communication interface for communicating with the user terminal 200 through the network NW, and communication is performed according to, for example, a communication protocol such as TCP/IP (Transmission Control Protocol/Internet Protocol).

The storage unit 230 may store programs, input information, and the like for executing various control processes or each function of the control unit 240 and is composed of RAM (Random Access Memory), ROM (Read Only Memory), and the like. In addition, the storage unit 320 may include a user information storing unit 321 for storing user-related information (e.g., setting information of the hearing device 100) that is a variety of information related to the user, a test result storing unit 322 for storing test results of the identification test, and an analysis result storing unit 323 for storing analysis results of sound data, and the like. Furthermore, the storage unit 320 may temporarily store information on communication with the user terminal 200. In addition, a database (not shown) that stores various kinds of information may be built outside the storage unit 320.

The control unit 330 may control the overall operation of the server 300 by executing a program stored in the storage unit 320, and may include a central processing unit (CPU), a graphics processing unit (GPU), and the like. As functions of the control unit 330, the control unit 330 may include an instruction receiving unit 331 for receiving an instruction from a user, a user information management unit 332 that refers to and processes user-related information, which is various information related to the user, a check test management unit 333 that executes a predetermined check test or refers to and processes test results, a parameter set generating unit 334 that analyzes the test results of the check test and generates a set of parameters, a sound data analysis unit 335 that analyzes input sound data, and an analysis result management unit 336 that refers to and processes analysis results. The instruction receiving unit 331, the user information management unit 332, the check test management unit 333, the parameter set generating unit 334, the sound data analysis unit 335 and the analysis result management unit 336 are activated by programs stored in the storage unit 320 and executed by the server 300 which is a computer (electronic computer).

When the instruction receiving unit 331 receives the instruction when a user generates a predetermined request through a user interface such as an application software screen or a web screen displayed on the user terminal 200, or through various sensors provided in the hearing device 100.

The user information management unit 332 may manage user-related information and perform predetermined processing as necessary. The user-related information may be, for example, a user ID, e-mail address information, or the like, and the user ID may be identified on an application while being associated with a result of a check test or an analysis result of sound data.

The check test management unit 333 may perform a predetermined check test (to be described later in the flowchart), refer to the check test result, or perform a predetermined process (e.g., display the result of the check test on the user terminal 200, transmit the result to the parameter set generating unit 334).

The parameter set generating unit 334 may generate a setting value such as increase/decrease a gain (amplification amount) for each of a plurality of predetermined frequencies (e.g., 8 channels or 16 channels) based on the above-described check test result and/or the analysis result of sound data to be described later.

The sound data analysis unit 335 may analyze input sound data. Here, the analysis of the sound data may mean performing frequency analysis of the input sound data using, for example, the Fast Fourier Transform, and determining that a noise with a specific frequency (e.g., a frequency derived from a location such as in a train, in an airplane, or on a street, or a frequency derived from a source such as a human voice or television) is stronger than a predetermined reference value, and the result of the determination may be transmitted to the parameter set generating unit 334 when it is determined that the noise is stronger than the predetermined reference value. Further, a noise with a specific frequency may be stored in association with each hearing mode, and furthermore, the hearing mode may be manually set by the user.

The analysis result management unit 336 may refer to the analysis result of the sound data or perform predetermined processing (e.g., displaying the analysis result on the user terminal 200, transmitting the result to the parameter set generating unit 334, or the like).

Process Flow

A process flow for controlling a hearing device executed by the system of the first embodiment of the present invention will be described with reference to FIG. 5. FIG. 5 is an example of a flowchart of a method of controlling a hearing device related with the first embodiment of the present invention. In addition, although the test for the initial settings is performed in the flowchart, the test may be performed not only for the initial settings but also for arbitrary timing, and the test may not be performed depending on users.

First, a test for initial settings is performed before using the hearing device 100 (step S101). On an application executed on the user terminal 200, a check test related to hearing (for example, a test to be disclosed in the fourth embodiment described later or a test in which a user presses an OK button when hearing a "beep" sound for each frequency, or the like) is performed for each of a plurality of frequencies (for example, 16 channels), a set of parameters are generated based on the corresponding test result, gains (amplification amounts) for frequencies are stored in the user terminal 200 as a set of parameters, and a gain (amplification amount) is set for each frequency of the hearing device by, for example, the DSP based on the set of parameters.

Next, the hearing device 100 may acquire sound data from the first input unit 110 and/or the second input unit 120 and transmit the sound data to the server 300 through the user terminal 200 (step S102).

Subsequently, the server 300 may analyze the sound data through the sound data analysis unit 335 and further generate a set of parameters (step S103).

Next, the server 300 may transmit the set of parameters to the hearing device 100 via the user terminal 200, stores the set of parameters in the storage unit 132, and further adjust the gain (amplification amount) for each frequency of the hearing device through the DSP based on the set of parameters (step S105). Steps S102 to S105 are executed every predetermined sample time.

Due to this, it is possible to finely adjust and output input sound to the user by performing adjustment in real time according to a sound (especially the ambient environment sound) input to the hearing device, thus enabling the user to be in a state capable of hearing easily.

First Modification of the First Embodiment

FIG. 6 is a block diagram showing a first modification of the first embodiment of the present invention. In the first modification of the first embodiment, unlike the first embodiment, the hearing device 100 is connected to the server 300 via a battery device 400 and the network NW rather than the user terminal 200. Further, although it has shown in FIG. 6 that the battery device 400 may also serve as a case of the hearing device 100, and has a structure which the hearing device 100 is able to be received and charged in a recessed portion, the battery device 400 is not limited thereto.

The battery device 400 is equipped with, for example, a SIM card (Subscriber Identity Module Card) to connect to the network NW, and may transfer sound data or a set of parameters between the hearing device 100 and the server 300, instead of the "user terminal 200" of the first embodiment.

Thereby, it is possible to connect to the network NW through the battery device 400 which is frequently carried by the user, thus making it possible to adjust an input sound without carrying the user terminal 200 to increase the user's convenience. In particular, it is useful for a high-age group with a low ownership rate of the user terminal 200.

Second Modification of the First Embodiment

FIG. 7 is a block diagram showing a second modification of the first embodiment of the present invention. In the second modification of the first embodiment, unlike the first embodiment and the first modification example, the hearing device 100 is directly connected to the server 300 via the network NW.

In this case, the hearing device 100 is equipped with, for example, a SIM card (Subscriber Identity Module Card), and may transmit/receive sound data and a set of parameters to/from the server 300.

Accordingly, the user can adjust the input sound without having a device for communication with the server 300, thereby increasing user convenience.

Third Modification of the First Embodiment

In the first embodiment and the first modification described above, operation by voice analysis using the input unit of the hearing device 100 is possible. In particular, in the second modification of the first embodiment, data (e.g., phone book or mail address, SNS ID and application, or the like) normally stored in the user terminal 200 is stored in the hearing device 100 or the server 300, a user's voice is acquired by the first input unit (or a third input unit (not shown) provided separately) of the hearing device 100, and contents uttered by the user is analyzed by the known voice analysis to enable the hearing device 100 itself to transmit a call or a message thereby further enhancing user convenience.

Fourth Modification of the First Embodiment

In the first embodiment and the first to third modifications described above, only sound data is analyzed to adjust the gain (amplification amount) of each frequency. In the fourth modification, the user terminal 200 or the battery device 400, the hearing device 100 may have a GPS function and further adjust the gain (amplification amount) of each frequency by adding location information, in addition to the sound data. That is, for example, by estimating a set of parameters from location information and a previous set of parameters (for example, stored in association with location information), such as being on a street or near a train, the hearing device 100 may be controlled by generating the set of parameters that sets the gain (amplification amount) of each frequency or selecting a hearing mode based on the estimated set of parameters and the analysis result of the sound data. In addition, by accumulating a large amount of adjustment amount, location information, time information, and the like in the server 300, and performing, for example, machine learning or deep learning, the hearing device 100 may be controlled more precisely. Further, after a previous set of parameters have been sufficiently accumulated, a set of parameters may be generated based on the location information alone.

Second Embodiment

FIG. 8 is a block diagram showing a second embodiment of the present invention. In the second embodiment, in addition to voice data input from the first input unit 110, music data output from the user terminal 200 and/or the server 300 and input through the communication unit 150 (e.g., compressed music data through Bluetooth (registered trademark) or the like) and voice data (e.g., voice data during a call) are also output from the output unit 140 via the adjustment unit 131.

Accordingly, the gain adjustment considering the ambient environmental sound is applied not only to the directly-input voice data, but also to the music data and the voice data from the user terminal 200, so that the user is easier to listen to music without influence by the ambient environmental sound, thus improving user convenience.

Third Embodiment

FIG. 9 is a block diagram showing a third embodiment of the present invention. In a third embodiment, for example, the hearing device 100 includes a right ear hearing device 510 and a left ear hearing device 520. The hearing device 510 includes a first sensor 511 and a second sensor 511 and the hearing device 520 includes a third sensor 521 and a fourth sensor 522. With this configuration, it is possible to operate the hearing device 100 by detecting a user's hand gesture. The first to fourth sensors 511, 512, 521 and 522 may be configured with, for example, an optical proximity sensor or an IR sensor, any sensor may be used as long as they are able to perform the same detection operation.

FIG. 10 shows a detection range of each sensor. Since the two sensors provided in each hearing device are arranged to be shifted in the vertical direction and the horizontal direction, as illustrated in FIG. 10, the sensors may detect a distance from each sensor and detect a predetermined operation (e.g., movement of a finger, etc.) in the oblique line portion where the detection ranges of the two sensors overlap.

Thereby, it is possible, for example, to operate the hearing device 100 by means of a finger gesture as in FIG. 11. That is, as illustrated in the left drawing and the central drawing of FIG. 11, the volume is changed along the direction in which the index finger is turned. As illustrated in the right drawing of FIG. 11, when the number of times the index finger and the thumb are aligned is one, music may be turned on/off, when the number of times the index finger and the thumb are aligned is two, the hearing mode may be changed.

Thereby, it is possible to operate the hearing device 100 easily without operating the user terminal 200, thus improving user convenience.

Fourth Embodiment

FIG. 12 is a flowchart showing a fourth embodiment of the present invention. In the fourth embodiment, an example of a new check test method regarding hearing will be described with reference to FIG. 12. Moreover, the new check test may be performed as the check test mentioned above.

First, the hearing device 100 may output the pronunciation of a plurality of randomly arranged numbers with a predetermined intensity (db) (e.g., "312" in English is output with 70 db) (S201).

Next, a check test of the hearing result is performed through the display unit of the user terminal 200 (S202). For example, as shown in FIG. 13, a multiple choice question of answering which of a plurality of number "321", "213", or "312" is pronounced number is presented. In addition, a button for repeatedly executing pronunciation for hearing may be provided and the number of times of pronunciation may be limited.

Next, S201 and S202 are repeated a plurality of times by changing the number and intensity. The number may be randomly selected from, for example, 1 to 9 and the intensity may be randomly selected from, for example, 30, 40, 50, 60, 70, 80, and 90 db and the test is repeatedly performed until all the numbers and the intensities are selected.

Next, after the test has been repeated a predetermined number of times (for example, about 10 times), the response contents is analyzed, a set of parameters according to the analysis result is generated, and the hearing device 100 is adjusted. In addition, for each number, for example, in English or Japanese, a frequency (e.g., 125, 350, 500, 600, 750, 1,000 Hz, etc.) associated with the pronunciation of each number is known, and it is possible to perform the check test covering frequencies of, for example, 16 channels by repeating the selection of the numbers such that all frequencies are covered by the test.

Thereby, the test can be performed more simply and accurately than the conventional check test, improving the user convenience.

Fifth Embodiment

FIG. 14 is a flowchart showing a fifth embodiment of the present invention. In the fifth embodiment, an example of a function for reducing tinnitus will be described with reference to FIG. 14.

First, an application is executed on the user terminal 200, and a tinnitus checking function is started (S301).

Next, a sound similar to a tinnitus sound is selected from a table of intensity (db) and frequency (Hz) presented in the application, for example, as shown in FIG. 14 (S302). As shown in FIG. 15, a sound of the selected position can be heard by selection in the table. Also, in particular, when tinnitus symptoms are present in both the right ear and the left ear, the above selection is performed for each of the right and left ears.

Next, an inverse-phase sound of the selected sound is set as a treatment sound (S303).

Thereafter, for example, as shown in FIG. 16, the tinnitus may be offset to reduce tinnitus by outputting a treatment sound from the hearing device 100. In particular, it is more useful for users with different strengths or frequencies of tinnitus on the left and right ears. For example, it is possible to select a sound of 2,000 Hz and 70 db for the left ear, select a sound of 1,000 Hz and 80 db for the right ear, and set sounds with inverse-phase as treatment sounds, respectively.

Sixth Embodiment

As described in third modification of the first embodiment, in particular, when a SIM card or GPS is mounted in the hearing device 100, it is possible to use various functions with the hearing device 100 alone by storing data, which has been stored in the user terminal 200, in the hearing device 100 or the server 300, at the same time, acquiring the user's voice and analyzing the contents of the user's speech by known voice analysis.

First Specific Example of the Sixth Embodiment

The first specific example may be a personal assistant, for example. That is, the user is able to set a timer or alarm, check a weather forecast, search for words or the like, call a taxi, or get navigation through a map and so on in such a way that a user verbally transmits a request and, if necessary, obtains a response from the server 300 or the like. In addition, the user is able to obtain a translation result in real time by connecting to a translation application or the like, which outputs the reading of the translation result to the user's ear. In addition, it may be possible to accumulate a large amount of translation results and actually spoken contents in the server 300 and allow the hearing device 100 to output the translation more precisely by machine learning or deep learning, or the like.

Thereby, it is possible to enable the user to use various functions especially with the hearing device 100 alone, thus improving convenience and providing a new business model.

Second Specific Example of the Sixth Embodiment

The second specific example may be a function to monitor a user, for example. That is, it may be possible to obtain sound data through the input unit of the hearing device 100, obtain a motion each corresponding to the sound data (e.g., a motion of using water, a motion of watching television, etc.) as a sample, accumulate a large amount of motions, and identify what kind of a motion the user is making more precisely by machine learning or deep learning. In addition, by accumulating a large amount of location information, time information, and the like in the server 300, and performing, for example, machine learning or deep learning, it is possible to identify and monitor the user's motion more precisely.

Thereby, it is possible to enable the user to use various functions especially with the hearing device 100 alone, thus improving convenience and providing a new business model.

Third Specific Example of the Sixth Embodiment

The third specific example may be, for example, an auxiliary function for conversation. That is, by acquiring sound data through the input unit of the hearing device 100 and analyzing the contents spoken by the user by known voice analysis, an appropriate response to the conversation may be transmitted to the user through the hearing device 100. In addition, by accumulating a large amount of conversation contents and response contents in the server 300, for example, and performing machine learning or deep learning, it is possible to provide a configuration of determining the user's appropriate response content more precisely and hinting at what the user has to answer, for example, during a meeting, such as a so-called cheating paper.

Thereby, it is possible to enable the user to use various functions especially with the hearing device 100 alone, thus improving convenience and providing a new business model.

Fourth Specific Example of the Sixth Embodiment

The fourth specific example may be, for example, a music recommendation function. That is, by accumulating, in the server 300, for example, the number of times of music reproduction, location information, time information, and the like, and performing machine learning or deep learning, it is possible to select music in response to the user's request more precisely. Furthermore, it may be preferable to select music in response to the user's request more precisely by performing music selection based on the result of preforming voice analysis on a song spoken by the user and lyric data (e.g., continuously playing the songs of the same artist, for example, Mr. Imaguchi's songs).

Thereby, it is possible to enable the user to use various functions, especially with the hearing device 100 alone, thus increasing convenience.

Although the embodiments as disclosed herein have been described, the embodiments can be implemented in other various forms and can be implemented by performing various omissions, substitutions and changes. Those embodiments and modifications and omissions, substitutions, and changes are included in the technical scope of the appended claims and their equivalents.

The invention claimed is:

1. A hearing device directly or indirectly connected to a server through a network, the hearing device comprising:
   an input unit configured to acquire sound data from the outside;
   a communication unit configured to transmit the sound data to the server and receive a set of parameters generated based on an analysis result obtained by analyzing the sound data in the server;
   a storage unit configured to store the set of parameters;
   an adjustment unit configured to adjust gains of a plurality of predetermined frequencies of the sound data based on the set of parameters; and
   an output unit configured to output adjusted sound data to a user as a sound,
   wherein the communication unit is configured to:
   receive a set of parameters generated based on a result of a test by the server, the test being performed by the user; and
   further adjust the gains of the plurality of predetermined frequencies based on the set of parameters.

2. The hearing device of claim 1, wherein the hearing device or a user terminal connected to the hearing device and the server through a network further includes a GPS,
   wherein the hearing device or the user terminal transmits location information from the GPS to the server,
   wherein the communication unit estimates a set of parameters to be generated based on the location information and a previous set of parameters by the server, and receives a set of parameters generated based on the analysis result of the sound data and the estimated set of parameters, and
   wherein the adjustment unit adjusts the gains of the plurality of predetermined frequencies based on the set of parameters.

3. The hearing device of claim 1, wherein the communication unit is connected to the hearing device and the server through a network to perform transmission and reception with the server via a user terminal equipped with a SIM.

4. The hearing device of claim 1, wherein the communication unit is connected to the hearing device and the server through a network to perform transmission and reception with the server via a battery device equipped with a SIM.

5. The hearing device of claim 1, wherein the hearing device is equipped with a SIM to perform transmission and reception with the server.

6. The hearing device of claim 1, wherein the adjustment device is configured to apply adjustment based on the set of parameters to at least one of music data or voice data received from the communication unit.

7. The hearing device of claim 1, wherein the hearing device further includes a plurality of IR sensors and operates the hearing device based on a detection result of the plurality of IR sensors.

8. The hearing device of claim 7, wherein the detection result is a movement of the user's finger.

9. The hearing device of claim 1, wherein the adjustment device is configured to apply adjustment based on the set of parameters to music data received from the communication unit.

10. The hearing device of claim 1, wherein the test is to repeatedly providing a question of outputting a pronunciation of a random sequence of numbers and checking a result of hearing, a plurality of times.

11. The hearing device of claim 1, wherein the output unit is configured to output a treatment sound for tinnitus selected by the user through the user terminal.

12. A method for adjusting a hearing device, comprising:
   acquiring, by the hearing device, sound data from the outside;
   transmitting the sound data to a server;
   analyzing, by the server, the sound data;
   generating a set of parameters based on a result of the analysis;
   receiving, by the hearing device, the set of parameters from the server;
   storing the set of parameters;
   adjusting gains of a plurality of predetermined frequencies of the sound data based on the set of parameters; and
   outputting adjusted sound data to a user as a sound,
   wherein the receiving includes receiving a set of parameters generated based on a result of a test by the server, the test being performed by the user; and
   adjusting the gains of the plurality of predetermined frequencies based on the set of parameters.

* * * * *